(12) United States Patent
Liu et al.

(10) Patent No.: US 11,797,284 B2
(45) Date of Patent: Oct. 24, 2023

(54) COMPOSABLE DEPLOYER ARCHITECTURE

(71) Applicant: International Business Machines Corporation, Armonk, NY (US)

(72) Inventors: Guang Ya Liu, Xian (CN); Xun Pan, Xian (CN); Hai Hui Wang, Xian (CN); Peng Li, Xian (CN); Xiang Zhen Gan, Xian (CN)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 17/382,934

(22) Filed: Jul. 22, 2021

(65) Prior Publication Data

US 2023/0025791 A1 Jan. 26, 2023

(51) Int. Cl.
| | | |
|---|---|---|
| *G06F 9/44* | (2018.01) | |
| *G06F 9/455* | (2018.01) | |
| *G06F 9/445* | (2018.01) | |
| *G06F 8/61* | (2018.01) | |
| *G06F 8/60* | (2018.01) | |

(52) U.S. Cl.
CPC . *G06F 8/61* (2013.01); *G06F 8/60* (2013.01)

(58) Field of Classification Search
CPC .............. G06F 8/60; G06F 8/61; G06F 8/63
See application file for complete search history.

(56) References Cited

U.S. PATENT DOCUMENTS

| | | | |
|---|---|---|---|
| 10,416,969 B2 * | 9/2019 | Fischer | ...................... G06F 8/60 |
| 11,385,877 B1 * | 7/2022 | Steavenson | ......... G06F 16/9024 |
| 2012/0084769 A1 | 4/2012 | Adi | |
| 2016/0239281 A1 * | 8/2016 | Avisror | ...................... G06F 8/61 |
| 2017/0139734 A1 * | 5/2017 | Cropper | .............. G06F 9/45558 |
| 2017/0286467 A1 * | 10/2017 | Eberlein | ............. G06F 16/2282 |
| 2018/0109421 A1 * | 4/2018 | Laribi | ................. H04L 43/0817 |
| 2019/0130008 A1 * | 5/2019 | Nakagoe | ................. H04L 67/10 |
| 2019/0243836 A1 * | 8/2019 | Nanda | ............... G06F 16/24568 |
| 2020/0327371 A1 * | 10/2020 | Sharma | ...................... G06N 5/04 |
| 2020/0334027 A1 * | 10/2020 | Kalaskar | ................... G06F 8/65 |
| 2020/0404076 A1 * | 12/2020 | Mahadevan | ............ H04L 67/34 |
| 2021/0034581 A1 * | 2/2021 | Boven | .................. G06K 9/6256 |
| 2021/0182042 A1 * | 6/2021 | Saha | ......................... G06F 8/61 |
| 2022/0138004 A1 * | 5/2022 | Nandakumar | .......... G06N 20/00 |
| | | | 718/102 |

(Continued)

FOREIGN PATENT DOCUMENTS

CN 110109701 A * 8/2019

OTHER PUBLICATIONS

Johann Mitlohner, Characteristics of Open Data CSV Files, 2016, pp. 72-79. 72-79. https://ieeexplore.ieee.org/stamp/stamp.jsp?tp=&arnumber=7573692 (Year: 2016).*

(Continued)

*Primary Examiner* — Mongbao Nguyen (74) *Attorney, Agent, or Firm* — Aaron Pontikos (57) ABSTRACT

A processor may receive a composable deployer comma-separated values (CSV) file. The processor may parse the composable deployer CSV file. The processor may determine if there is a composable deployer foundation template. The processor may install a resource. The resource to install may be associated with the composable deployer foundation template.

20 Claims, 7 Drawing Sheets

(56) References Cited

U.S. PATENT DOCUMENTS

2022/0236976 A1* 7/2022 Wiegley .................. G06F 8/71
2022/0270523 A1* 8/2022 Negri ..................... G06F 8/61
2022/0353341 A1* 11/2022 Östrand ............. G06F 9/45558

OTHER PUBLICATIONS

Matthew Casperson, The ultimate guide to Kubernetes microservice deployments, 2020, pp. 1-28. https://octopus.com/blog/ultimate-guide-to-k8s-microservice-deployments (Year: 2020).*

Pradeep Pai T, Building cloud native application—analysis for multi-component application deployment, Jan. 2021, pp. 1-6. https://ieeexplore.ieee.org/stamp/stamp.jsp?tp=&arnumber=9402422 (Year: 2021).*

Kitti Klinbua, Translating TOSCA into Docker-Compose YAML File Using ANTLR, 2017, pp. 1-4. https://ieeexplore.ieee.org/stamp/stamp.jsp?tp=&arnumber=8342884 (Year: 2017).*

Anonymous. "Composable." Printed May 13, 2021. 5 pages. Published by Operator Hub. https://operatorhub.io/operator/composable-operator.

Anonymous. "IBM Deployment Model." Published Mar. 19, 2007. 4 pages. Published by IP.com. https://priorart.ip.com/IPCOM/000147541.

Anonymous. "Smart Build and Deploy Engine for Component Architecture and Composite Applications." Published Dec. 20, 2007. 5 pages. Published by IP.com. https://priorart.ip.com/IPCOM/000165572.

Anonymous. "Solution Deployer for any servers and systems." Published Nov. 24, 2014. 7 pages. Published by IP.com. https://priorart.ip.com/IPCOM/000239665.

De Magalhaes, Arthur, "Deploy and bind enterprise-grade microservices with Kubernetes Operators." Published Jun. 18, 2020. 13 pages. Published by Red Hat Developer. https://developers.redhat.com/blog/2020/05/18/deploy-and-bind-enterprise-grade-microservices-with-kubernetes-operators/.

Github, "IBM / Operand-deployment-lifecycle-manager." Printed May 25, 2021. 4 pages. Published by Github. https://github.com/IBM/operand-deployment-lifecycle-manager.

Github, "Kubevirt—hyperconverged-cluster-operator." Printed May 25, 2021. 7 pages. Published by Github. https://github.com/kubevirt/hyperconverged-cluster-operator.

Mell, et al., "The NIST Definition of Cloud Computing," Recommendations of the National Institute of Standards and Technology, U.S. Department of Commerce, Special Publication 800-145, Sep. 2011, 7 pgs.

* cited by examiner

```
apiVersion: composable.operators.install.com/v1alpha1
kind: ComposableDeployerFoundation
metadata:
        name: composable-deployer-foundation
spec:
        composableComponents:
        - name: com1
          enabled: true
        - name: com2
          enabled: true
        - name: com3
          enabled: true
```

```
apiVersion: operators.coreos.com/v1alpha1
kind: ClusterServiceVersion
metadata:
    annotations:
       alm-examples: | -
          [
             {
                "apiVersion": "orchestrator.aiops.installer.com/v1alpha1",
                "kind": "ComposableDeployer",
                "metadata": {
                    "name": "composable-deployer"
                },
                "spec": {
                    "imagePullSecret": "",
                    "license": {
                        "accept": false
                    },
                    "storageClass": "portworx-fs"
                    "storageClassLargeBlock": "portworx-aiops"
                }
             }
          ]
       ComposableDeployerFoundation: |-
             apiVersion: composable.operators.ibm.com/v1alpha1
             kind: ComposableDeployerFoundation
             metadata:
                 name: composable-deployer-foundation
             spec:
                 composableInstallerFoundation:
                    - name: com1
                      enabled: true
                    - name: com2
                      enabled: true
                    - name: com3
                      enabled: true
```

COMPOSABLE DEPLOYER ARCHITECTURE

BACKGROUND

The present disclosure relates generally to the field of component/application installation, and more specifically to composable deployers for component/application installation.

A deployer usually focuses on the installation of a single component/application, or multiple components/applications together. Each deployer typically has its own complex logic to install such components/applications, which makes it difficult to manage and deploy.

SUMMARY

Embodiments of the present disclosure include a method, computer program product, and system to a composable deployer environment. A processor may receive a composable deployer comma-separated values (CSV) file. The processor may parse the composable deployer CSV file. The processor may determine if there is a composable deployer foundation template. The processor may install a resource. The resource to install may be associated with the composable deployer foundation template.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of component/application installation, and more specifically to composable deployers for component/application installation. While the present disclosure is not necessarily limited to such applications, various aspects of the disclosure may be appreciated through a discussion of various examples using this context.

A deployer is usually focusing on installation of a single component/application or multiple components/applications together. Each deployer typically has its own logic to install those components/applications. Red Hat OpenShift Operators are a kind of deployer for packing, deploying, and managing a Kubernetes™-native application, where one operator can deploy one or more components, depending on the operator logic. It is noted that operators are pieces of software that ease the operational complexity of running another piece of software. They act like an extension of the software vendor's engineering team, watching over a Kubernetes™ environment (such as OpenShift Container Platform) and using its current state to make decisions in real time.

The problem for current deployers is that most of the deployers have very complex logic to install multiple components/applications. The complex logic usually defines the parameters for each component/application, defines the components to be managed by an installer, defines for how to handle the install process. etc. Currently, there are some projects trying to simplify the deploy process, such as, micro services deployment, operator (e.g., each operator managing one component), etc.; the overarching goal for the projects is to simplify the deploy process for each component.

With micro services deployment, operator, etc., another problem has appeared; it is difficult to manage and deploy a group of micro services or operators. It is noticed that there are already some open-source projects trying to handle this, like IBM operand-deployment-lifecycle-manager (ODLM), meta-operator, etc. The problem for the aforementioned meta-operator solution is that the meta-operator can only manage a specified group of operators or components, and there is no common library that can be leveraged by all installers or meta-operators. As such, each deployer, or operator, is required to write a lot of code to handle its own logic.

Accordingly, disclosed herein is a composable deployer logic that has configuration handling for each deployer, a common logic for a deployer, and a common logic can be shared by all deployers. In some embodiments, the configuration handling for each deployer includes handling imagePullSecret, resource requests (which piece of hardware is to be used [RAM, ROM, CPU, GPU, etc.], etc., and the handling of parameters for components managed by a particular deployer. In some embodiments, the common logic for a deployer may include install, upgrade, and/or rollback logic for a group of components/applications. Further, the common logic may further include a component enable or disable. For example, during an upgrade, an application can be disabled/turned off/not used to allow for another application to have increased processing, or vice-versa. In another example, if a component/application is faulty, it could be disabled to avoid any adverse effects on the rest of the components.

It is noted that the benefits of a composable deployer is that there is less code for each composable deployer, all deployers can share a same code repository template (e.g., composable deployer foundation template), and each deployer only needs to add a minor, new logic to handle its own logic based on the code repository template. Further noted is that in a composable infrastructure, compute, storage, and networking resources are abstracted from their physical locations and can be managed by software through a(n) (web-based) interface.

Figure 1A:
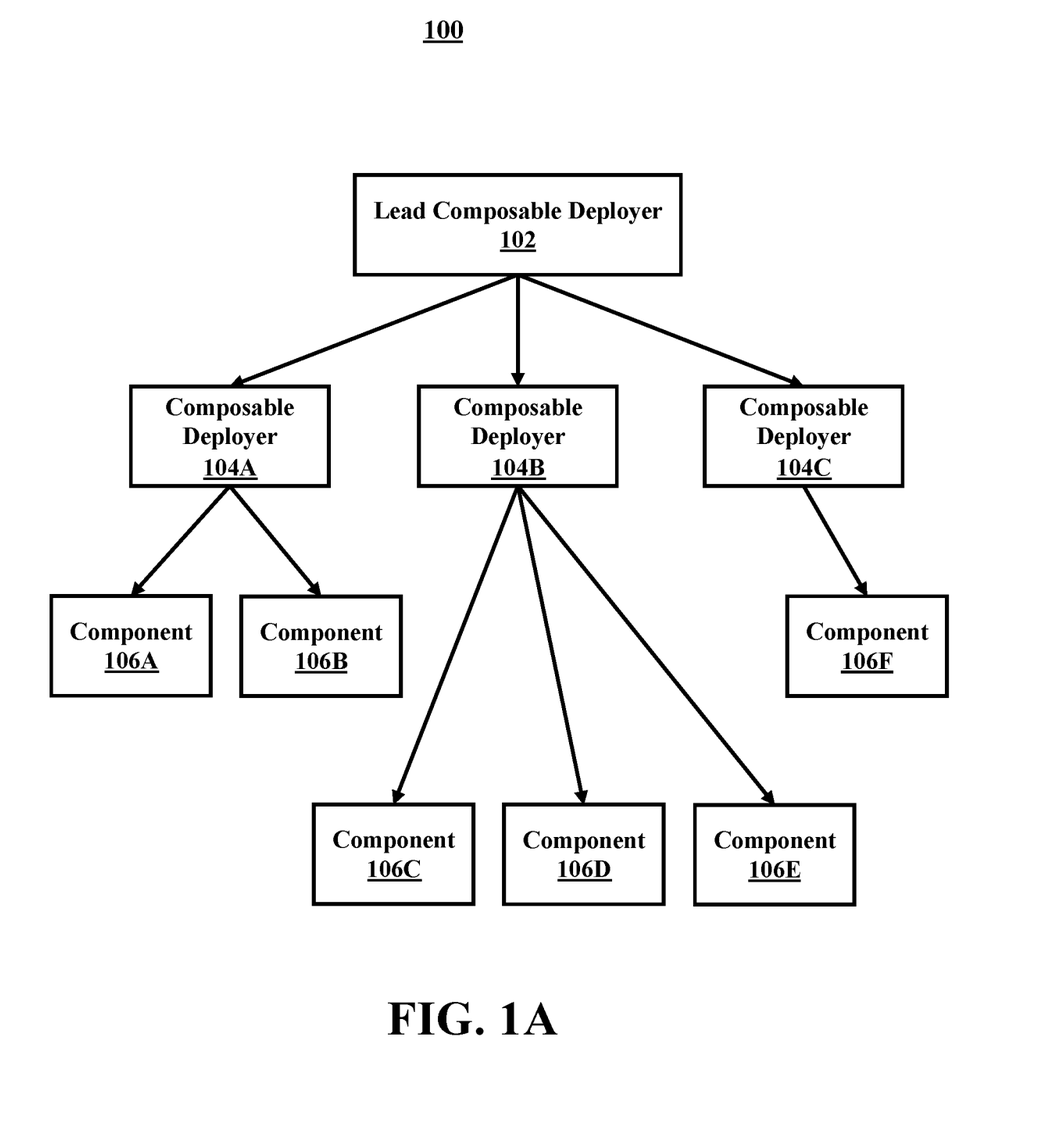
FIG. 1A illustrates a block diagram of an exemplary composable deployer system, in accordance with aspects of the present disclosure.

Referring now to FIG. 1A, illustrated is a block diagram of an exemplary composable deployer system 100, in accordance with aspects of the present disclosure. As depicted, the composable deployer system 100 includes a lead composable deployer 102, composable deployer 104A-C, and components (e.g., applications) 106A-F. It is noted that as depicted the composable deployers 104A-C each interact with a different amount of components 106A-F, but the composable deployers 104A-C could interact with any number of components.

In some embodiments, the lead composable deployer 102 includes a template (e.g., code template, logic template, composable deployer foundation template, etc.) and relays the template to each of the composable deployers 104A-C. Each of the composable deployers 104A-C then augments (e.g., adds particular code, deletes code, parses code, etc.) the template such that it is now specific to the components 106A-F that are respectively managed/in communication with the composable deployers 104A-C.

In such an embodiment, the lead composable deployer 102 and the composable deployers 104A-C are based on a composable deployer foundation, which allows each of the deployers (102 and 104A-C) to require less code and simple logic to handle install processes. In some embodiments, the composable deployer foundation allows for reconciliation of composable deployer specified logic, mainly for parameter handling, such as, parameters for each managed component 106A-F and parameters for the composable deployers 104A-C (e.g., where the deployers are selected and delegated their roles and management of components, etc.). Further, the composable deployer foundation allows for reconciliation of general logic for deployers (102 and 104A-C), mainly for enablement/disablement of a group of components (106A-F) based on component configurations (e.g., one component should be disabled to allow another component to work more effectively, etc.)

As an example, lead composable deployer 102 may have access, and the ability to change the template, as needed. The lead composable deployer may then communicate with the composable deployers 104A-C about any changes to the template (e.g., updates, rollbacks, etc.). The composable deployers 104A-C may then analyze the template and information about their components 106A-F (e.g., one component is an application for graphics, one component is an application for audio, etc.), and the composable deployers 104A-C update the template based on/for their specific components 106A-F. The composable deployers 104A-C may then relay the updated template(s) to their respective components 106A-F and components 106A-F may then update, etc. based on the updated template(s).

Figure 1B:
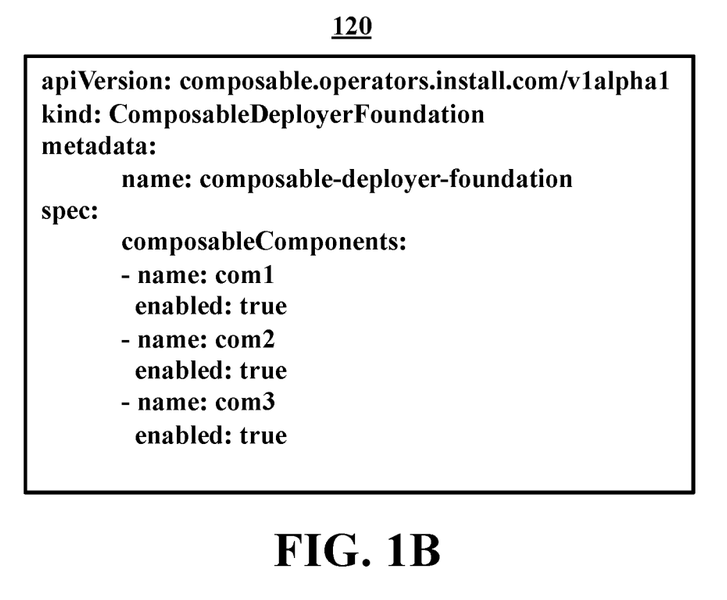
FIG. 1B illustrates a composable deployer foundation, in accordance with aspects of the present disclosure.

Turning now to FIG. 1B, illustrated is a composable deployer foundation 120, in accordance with aspects of the present disclosure. As depicted, the composable deployer foundation 120 handles the common logic for a deployer, such as the deployers 102 and 104A-C of FIG. 1A. The handling of the common logic indicates the components, such as the components 106A-F, to be managed and to enable or disable the components.

Figure 1C:
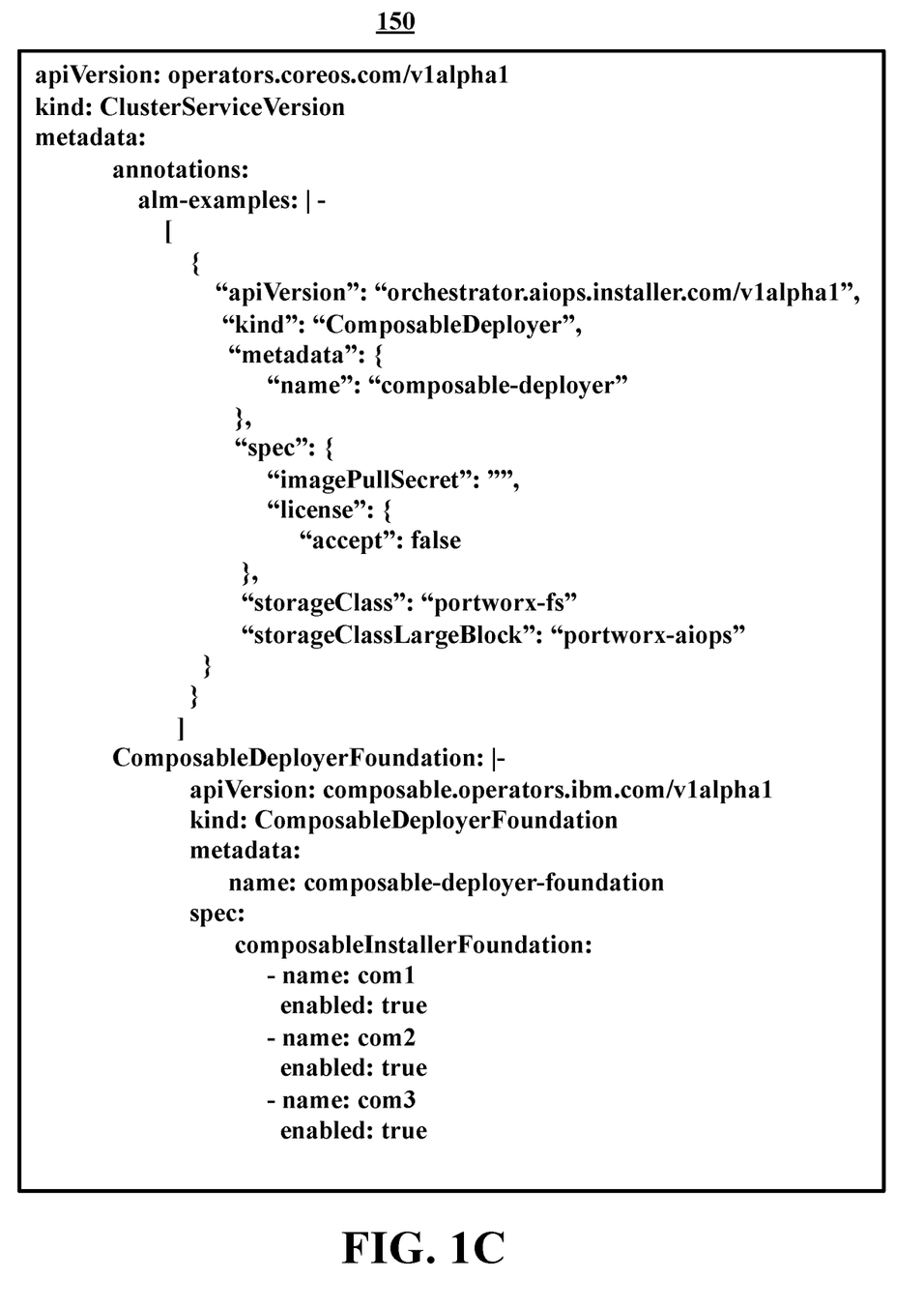
FIG. 1C illustrates a composable deployer, in accordance with aspects of the present disclosure.

Turning now to FIG. 1C, illustrated is a composable deployer 150, in accordance with aspects of the present disclosure. As depicted, the composable deployer 150 is built on-top of the composable deployer foundation 120. In some embodiments, the composable deployer 150 handles its own logic and parameters (e.g., imagePullSecret, etc.). Further, the composable deployer 150 may leverage the composable deployer foundation 120 to manage a group of components (e.g., 106A-F of FIG. 1A).

Figure 2:
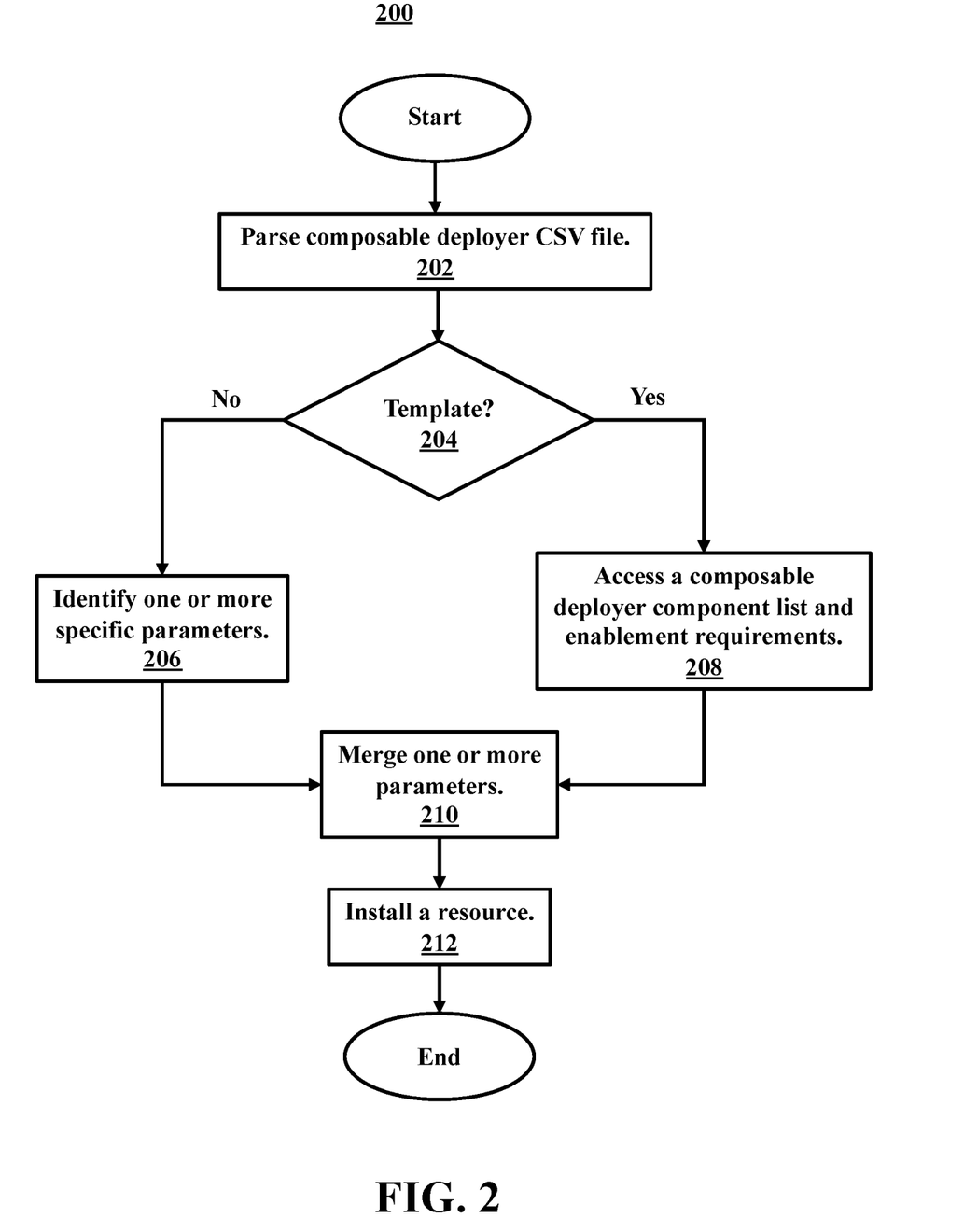
FIG. 2 illustrates a flowchart of an exemplary method to a composable deployer environment, in accordance with aspects of the present disclosure.

Referring now to FIG. 2, illustrated is a flowchart of an exemplary method 200 to a composable deployer environment, in accordance with aspects of the present disclosure. In some embodiments, the method 200 may be performed by a processor (e.g., of the composable deployer system 100 of FIG. 1, running the composable deployer foundation 120 of FIG. 1B, running the composable deployer 150 of FIG. 1C, etc.).

In some embodiments, the method 200 begins at operation 202 where the processor parses a composable deployer comma-separated values (CSV) file. In some embodiments, although not depicted, the method 200 may begin with the processor receiving the composable deployer CSV file. In some embodiments, the method 200 proceeds to decision block 204, where it is determined if there is a composable deployer foundation template.

In some embodiments, if, at decision block 204 it is determined/identified that the composable deployer foundation template does not exist, the method 200 proceeds to operation 206. At operation 206, the processor identifies one or more specific parameters (e.g., components, requirements, etc.) for/of the composable deployer CSV file. In some embodiments, although not depicted, the processor may generate the composable deployer foundation template utilizing the one or more specific parameters and the composable deployer foundation template could be used in subsequent interactions with deployers/operators that manage a specific component/application.

In some embodiments, if, at decision block 204 it is determined/identified that the composable deployer foundation template does exist, the method 200 proceeds to operation 208. At operation 208, the processor accesses a composable deployer component list and enablement requirements (associated with the CSV file and/or associated with the component list/enablement requirements of the composable deployer 150 of FIG. 1C).

In some embodiments, after either, or both (in the embodiment after operation 206 a template is then generated), operations 206 and/or 208, the method 200 proceeds to operation 210. At operation 210 the processor merges one or more parameters with the composable deployer CSV file and/or the template (e.g., a composable deployer/operator merges the parameters to be specific to the component(s) they manage).

In some embodiments, after operation 210, the method 200 proceeds to operation 212, where a resource (e.g., update, the parameters, etc.) is installed (on one or more components managed by a composable deployer). In some embodiments, the resource to install is associated with the composable deployer foundation template (e.g., the template details which components are enabled/disabled, which are to be upgraded, etc.). In some embodiments, after operation 212, the method 200 may end.

In some embodiments, discussed below, there are one or more operations of the method 200 not depicted for the sake of brevity and which are discussed throughout this disclosure. Accordingly, in some embodiments, the processor may enable fine-grained management for one or more components of the composable deployer CSV file based on the composable deployer foundation template. That is, management of components can be specific to the component and certain areas of the template can be highlighted/indicated for easy augmenting, which alleviates the need for the deployer/operator to analyze complex logic and allows the deployer/ operator to automatically and more efficiently (e.g., with less computing/processing power) to change their managed component(s).

In some embodiments, a deployer of the composable deployer CSV file is a hierarchical deployer (e.g., as depicted in the composable deployer system 100 of FIG. 1A), and in such an embodiment the processor may deploy the composable deployer CSV file to one or more other deployers as the composable deployer foundation template.

In some embodiments, deploying the composable deployer CSV file to one or more other deployers as the composable deployer foundation template allows for a unified model, and in such an embodiment, the processor may permit the one or more other deployers to generate a new composable deployer (e.g., a lead composable deployer allows/permits subsequent deployers to be able to augment/change the template/file, thus making the subsequent deployers composable deployers).

In some embodiments, the unified model utilizes less code to generate the new composable deployer (e.g., due to the new composable deployer not needed to analyze, change, or generate their own complex code).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
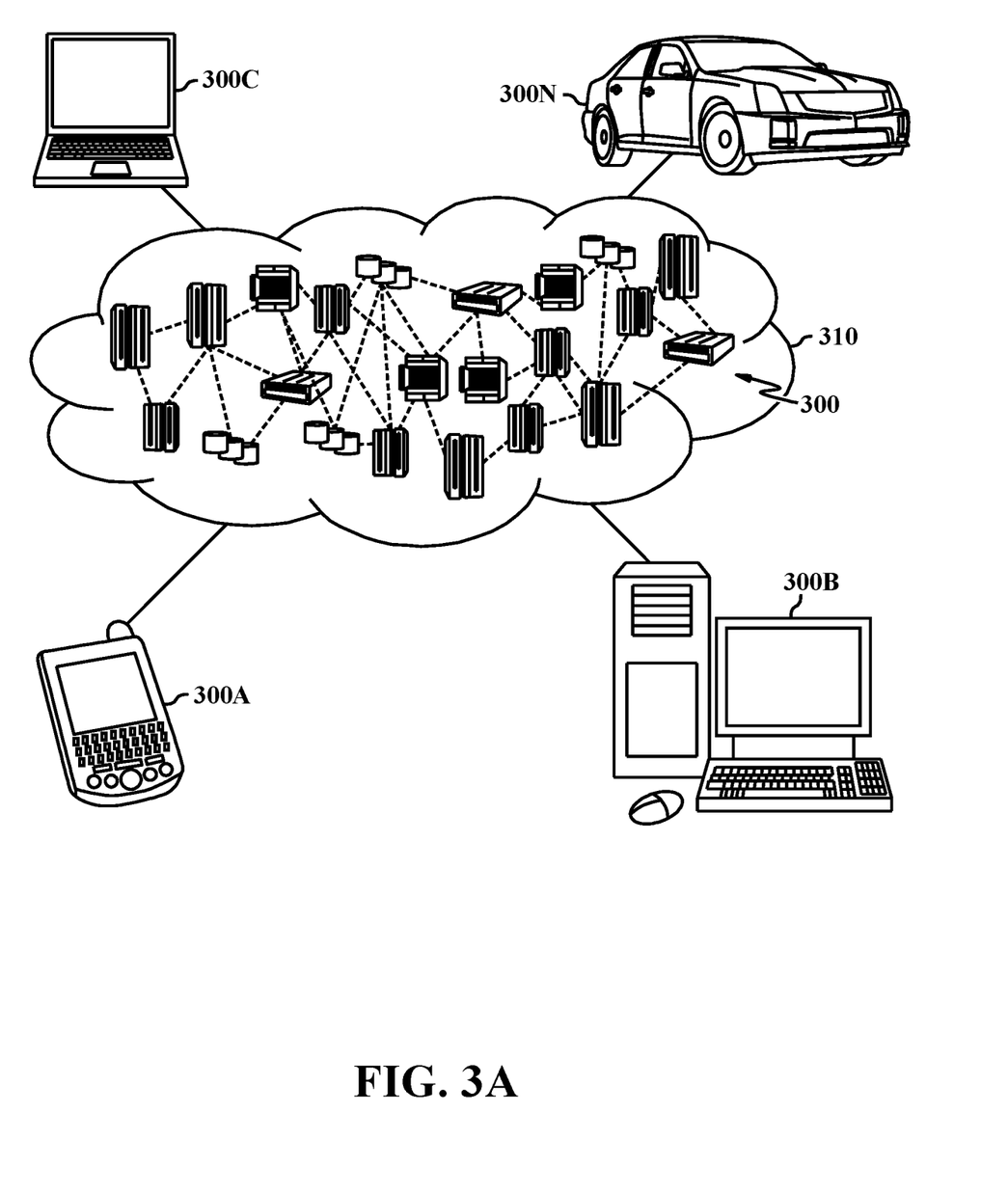
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
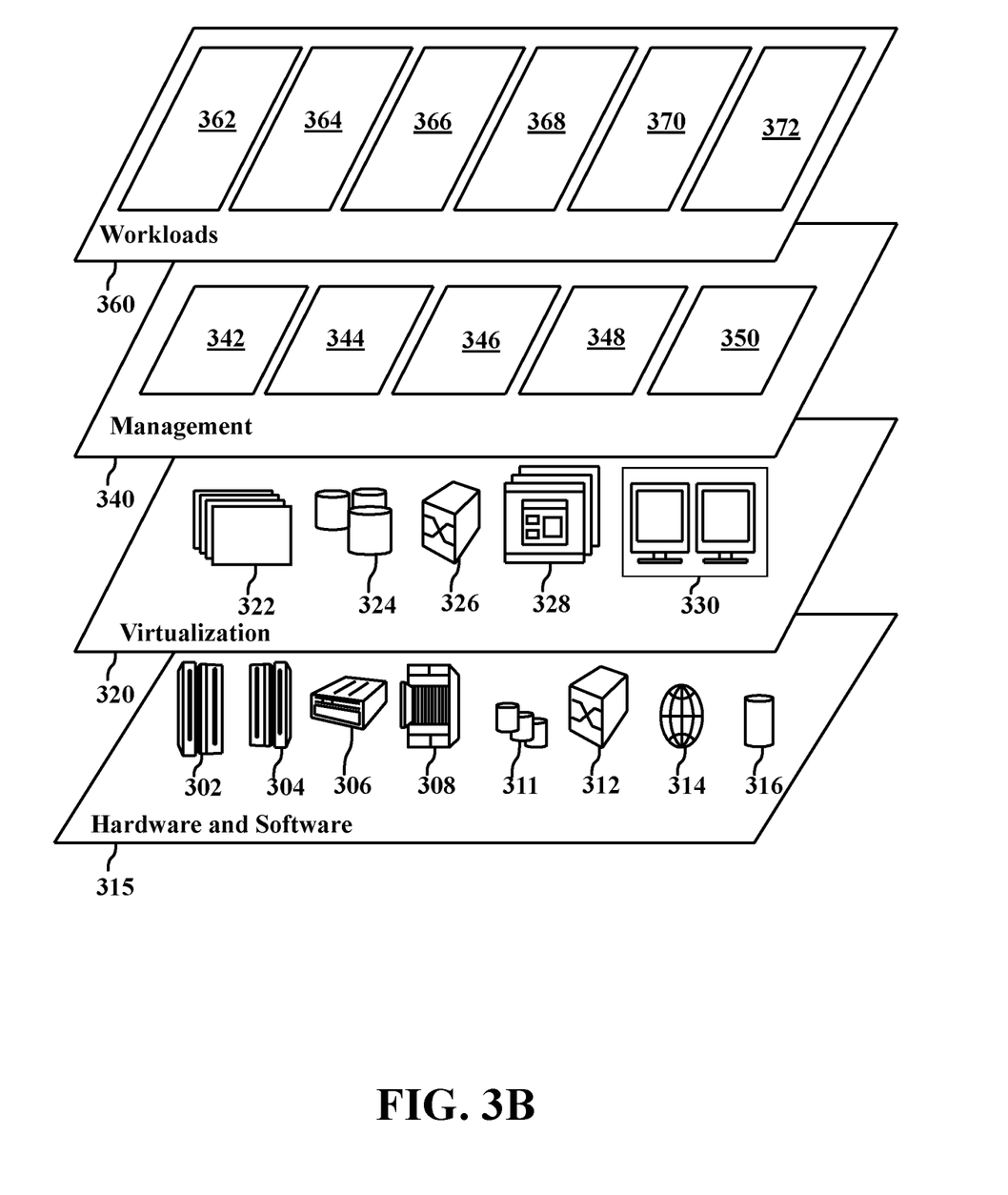
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and a composable deployer environment 372.

Figure 4:
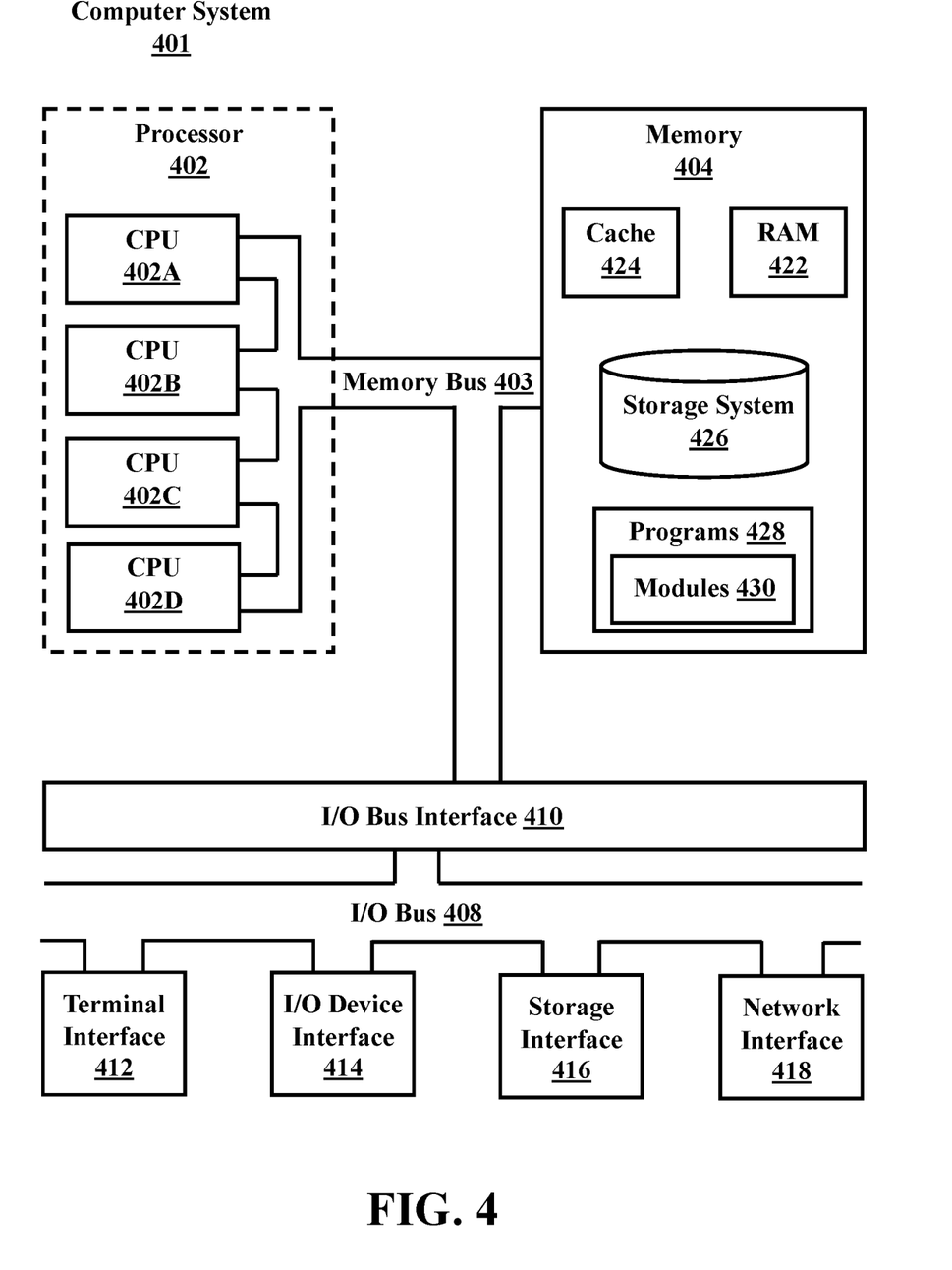
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system for a composable deployer environment, the system comprising:
    a memory; and
    a processor in communication with the memory, the processor being configured to perform operations comprising:
        receiving a composable deployer comma-separated values (CSV) file;
        parsing the composable deployer CSV file to determine whether a composable deployer foundation template exists for use by a composable deployer to make changes to an application managed by the composable deployer, wherein the composable deployer foundation template is shareable between respective composable deployers of a group of different composable deployers; and
        responsive to determining that a composable deployer foundation template does exist for use by the composable deployer to make changes to the application, installing a resource, wherein the resource to install is associated with the composable deployer foundation template.

2. The system of claim 1, wherein the processor is further configured to perform operations comprising:
    merging one or more parameters with the composable deployer CSV file.

3. The system of claim 1, wherein responsive to determining that a composable deployer foundation template does not exist for use by the composable deployer to makes change to the application managed by the composable deployer:
    identifying one or more specific parameters for the composable deployer CSV file; and
    generating the composable deployer foundation template.

4. The system of claim 1, further comprising, responsive to determining-a composable deployer foundation template does exist for use by the composable deployer to make changes to the application managed by the composable deployer:
    accessing a composable deployer component list and enablement requirements.

5. The system of claim 1, wherein the processor is further configured to perform operations comprising:
    enabling fine-grained management for one or more components of the composable deployer CSV file based on the composable deployer foundation template.

6. The system of claim 1, wherein a deployer of the composable deployer CSV file is a hierarchical deployer, and wherein the processor is further configured to perform operations comprising:
    deploying the composable deployer CSV file to one or more other deployers as the composable deployer foundation template.

7. The system of claim 6, wherein deploying the composable deployer CSV file to one or more other deployers as the composable deployer foundation template allows for a unified model, and wherein the processor is further configured to perform operations comprising:
    permitting the one or more other deployers to generate a new composable deployer.

8. The system of claim 7, wherein the unified model utilizes less code to generate the new composable deployer.

9. A method to a composable deployer environment, the method comprising:
    receiving, by a processor, a composable deployer comma-separated values (CSV) file;
    parsing the composable deployer CSV file to determine whether a composable deployer foundation template exists for use by a composable deployer to make changes to an application managed by the composable deployer, wherein the composable deployer foundation template is shareable between respective composable deployers of a group of different composable deployers; and
    responsive to determining that a composable deployer foundation template does exist for use by the composable deployer to modify the application, installing a resource, wherein the resource to install is associated with the composable deployer foundation template.

10. The method of claim 9, further comprising:
    merging one or more parameters with the composable deployer CSV file.

11. The method of claim 9, wherein responsive to determining that a composable deployer foundation template does not exist for use by the composable deployer to make changes to the application managed by the composable deployer:
    identifying one or more specific parameters for the composable deployer CSV file; and
    generating the composable deployer foundation template.

12. The method of claim 9, further comprising, responsive to determining a composable deployer foundation template does exist for use by the composable deployer to make changes to the application managed by the composable deployer:

accessing a composable deployer component list and enablement requirements.

13. The method of claim 9, further comprising:
enabling fine-grained management for one or more components of the composable deployer CSV file based on the composable deployer foundation template.

14. The method of claim 9, wherein a deployer of the composable deployer CSV file is a hierarchical deployer, and wherein the method further comprises:
deploying the composable deployer CSV file to one or more other deployers as the composable deployer foundation template.

15. The method of claim 14, wherein deploying the composable deployer CSV file to one or more other deployers as the composable deployer foundation template allows for a unified model, and wherein the method further comprises:
permitting the one or more other deployers to generate a new composable deployer.

16. The method of claim 15, wherein the unified model utilizes less code to generate the new composable deployer.

17. A computer program product for a composable deployer environment comprising a computer readable storage medium having program instructions embodied therewith, the program instructions executable by a processor to cause the processor to perform operations, the operations comprising:
receiving a composable deployer comma-separated values (CSV) file;
parsing the composable deployer CSV file to determine whether a composable deployer foundation template exists for use by a composable deployer to make changes to an application managed by the composable deployer, wherein the composable deployer foundation template is shareable between respective composable deployers of a group of different composable deployers; and
responsive to determining that a composable deployer foundation template does exist for use by the composable deployer to make changes to the application, installing a resource, wherein the resource to install is associated with the composable deployer foundation template.

18. The computer program product of claim 17, wherein the processor is further configured to perform operations comprising:
merging one or more parameters with the composable deployer CSV file.

19. The computer program product of claim 17, wherein responsive to determining that a composable deployer foundation template does not exist for use by the composable deployer to make changes to the application managed by the composable deployer:
identifying one or more specific parameters for the composable deployer CSV file; and
generating the composable deployer foundation template.

20. The computer program product of claim 17, further comprising, responsive to determining a composable deployer foundation template does exist for use by the composable deployer to make changes to the application managed by the composable deployer:
accessing a composable deployer component list and enablement requirements.

* * * * *